(12) United States Patent
DePalma et al.

(10) Patent No.: US 11,794,409 B2
(45) Date of Patent: *Oct. 24, 2023

(54) RESIN DISTRIBUTION AND MAINTENANCE SYSTEM

(71) Applicant: General Electric Company, Schenectady, NY (US)

(72) Inventors: Stephanie Lynn DePalma, Miamisburg, OH (US); William Cosmo Murphy, Waynesville, OH (US); Travis Sands, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/563,046

(22) Filed: Sep. 6, 2019

(65) Prior Publication Data
US 2019/0389131 A1 Dec. 26, 2019

Related U.S. Application Data

(63) Continuation of application No. 15/220,004, filed on Jul. 26, 2016, now Pat. No. 10,442,134.

(51) Int. Cl.
*B29C 64/35* (2017.01)
*B29C 64/307* (2017.01)
(Continued)

(52) U.S. Cl.
CPC ............ *B29C 64/35* (2017.08); *B29C 64/124* (2017.08); *B29C 64/307* (2017.08);
(Continued)

(58) Field of Classification Search
CPC ... B29C 61/124; B29C 64/307; B29C 64/357; B29C 67/0096
See application file for complete search history.

(56) References Cited

U.S. PATENT DOCUMENTS

| 4,125,874 A | 11/1978 | Higashide et al. |
| 4,999,143 A | 3/1991 | Hull et al. |

(Continued)

FOREIGN PATENT DOCUMENTS

| CN | 10342907 | 12/2013 |
| CN | 104608386 | 5/2015 |

(Continued)

OTHER PUBLICATIONS

Unofficial English translation of Chinese Office Action issued for relating CN Application No. 201780046547.7 dated May 8, 2020.

*Primary Examiner* — Kelly M Gambetta
(74) *Attorney, Agent, or Firm* — Dority & Manning, P.A.

(57) ABSTRACT

A method is provided for maintaining resin in a system including a main feed tank and at least one vat, each of the at least one vats associated with a 3-D printing machine. The method includes the steps of: transferring resin from the main feed tank to the at least one vat; operating the associated 3-D printing machine in a build cycle; returning the resin from the at least one vat to the main feed tank; and repeating in a cycle the steps of transferring the resin, operating the 3-D printing machine, and returning the resin.

17 Claims, 3 Drawing Sheets

(51) Int. Cl.
    *B29C 64/124*          (2017.01)
    *B29C 64/357*          (2017.01)
    *B33Y 40/00*            (2020.01)
    *B29C 64/321*          (2017.01)
    *B29C 64/393*          (2017.01)
    *B29L 9/00*              (2006.01)

(52) U.S. Cl.
    CPC ............ *B29C 64/357* (2017.08); *B33Y 40/00* (2014.12); *B29C 64/321* (2017.08); *B29C 64/393* (2017.08); *B29L 2009/00* (2013.01)

(56) References Cited

U.S. PATENT DOCUMENTS

| | | | |
|---|---|---|---|
| 5,248,249 A * | 9/1993 | Yamamoto | B29C 64/357 425/174.4 |
| 6,246,424 B1 | 6/2001 | Desie et al. | |
| 6,776,099 B1 * | 8/2004 | Landa | G03G 15/0121 101/489 |
| 8,888,480 B2 | 11/2014 | Yoo et al. | |
| 8,974,019 B2 | 3/2015 | Sakamoto et al. | |
| 9,134,655 B2 | 9/2015 | Berg et al. | |
| 9,643,362 B2 * | 5/2017 | Amadio | B29C 64/106 |
| 9,688,020 B2 | 6/2017 | Teken et al. | |
| 2015/0142159 A1 * | 5/2015 | Chang | B29C 64/124 700/119 |
| 2017/0050389 A1 * | 2/2017 | Lee | B33Y 40/00 |

FOREIGN PATENT DOCUMENTS

| | | |
|---|---|---|
| CN | 105172146 A | 12/2015 |
| CN | 105195741 A | 12/2015 |
| EP | 1769904 A2 | 4/2007 |
| WO | 2015/170895 A1 | 11/2015 |

* cited by examiner

RESIN DISTRIBUTION AND MAINTENANCE SYSTEM

BACKGROUND OF THE INVENTION

The present invention relates to maintaining resin at a predetermined quality and more specifically to maintaining resin for a 3-D printing process at a predetermined quality and efficiency.

3-D printing is a type of additive manufacturing process in which a photopolymer resin is selectively cured in order to form a part. The resin used for a 3-D printing process is contained in a vat associated with a 3-D printing machine. Resin is provided to the vat prior to a build process. A portion of the resin provided is consumed during the build process to form a part. Over time, the remaining resin is likely to deteriorate such that it is no longer of a sufficient quality to produce satisfactory parts. At such time the resin is disposed of and the vat is cleaned. This results in losses due to time spent cleaning the vat and machine and waste of resin. Therefore, there is a need for a system and method for maintaining resin so that it can be reused for subsequent 3-D printing build cycles.

BRIEF DESCRIPTION OF THE INVENTION

This need is addressed by a system that is configured to distribute resin from a primary tank to at least one 3-D printing machine and to return resin from the machine to the primary tank based upon a predetermined metric such as the number of build cycles, laser exposure hours, a resin chemical signature.

According to one aspect of the technology described herein, there is provided a method for maintaining resin in a system including a main feed tank and at least one vat, each of the at least one vats associated with a 3-D printing machine. The method includes the steps of: transferring resin from the main feed tank to the at least one vat; operating the 3-D printing machine in the build cycle; returning resin from the at least one vat to the main feed tank; and repeating in a cycle the steps of transferring the resin, operating the 3-D printing machine, and returning the resin.

According to one aspect of the technology described herein, a system is provided for maintaining the condition of resin used in sequential build cycles by a 3-D printing machine. The system includes: a main feed tank; and a vat configured to receive resin from the main feed tank. The vat is configured such that resin can be returned from the vat to the main feed tank.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
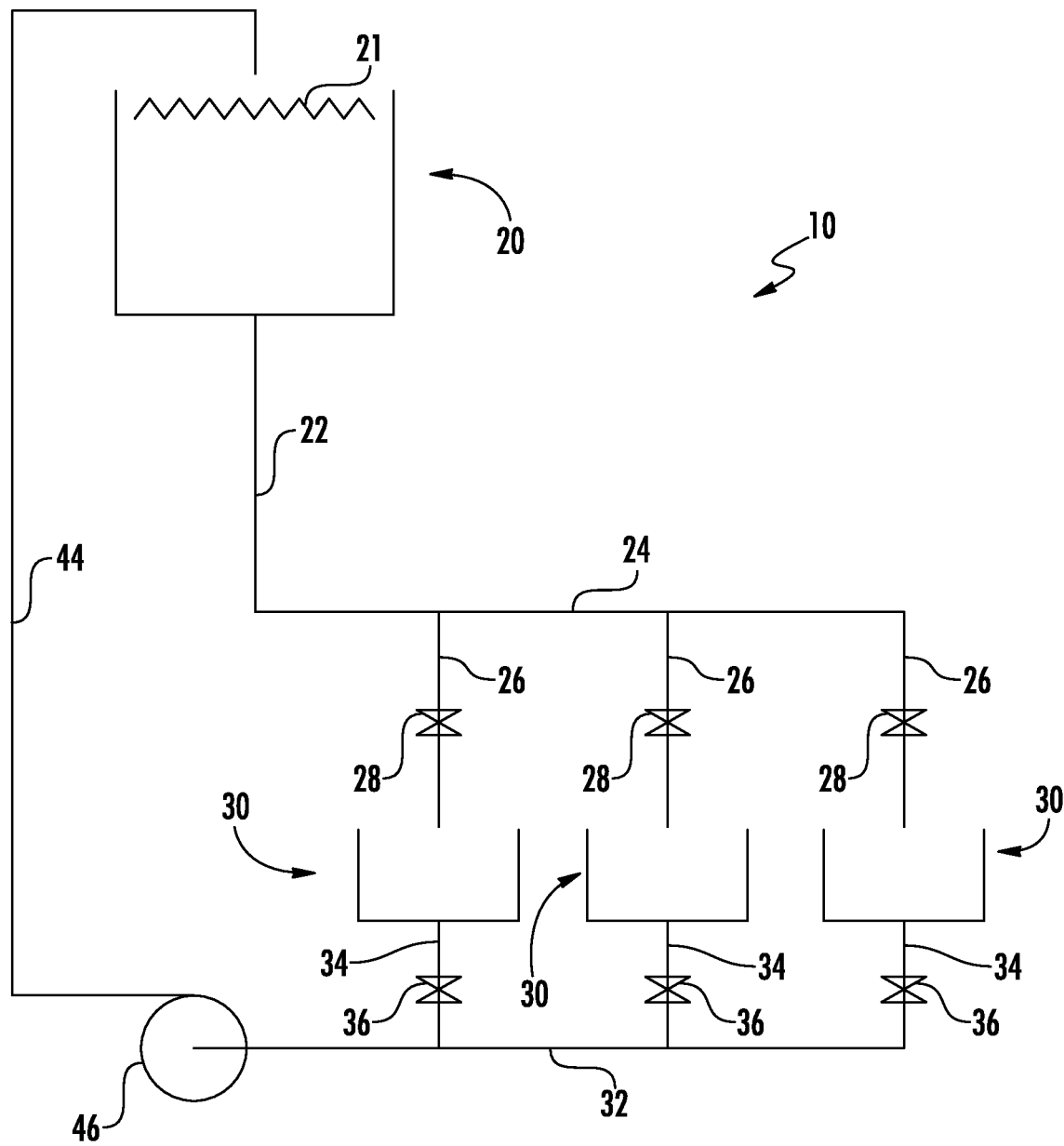
FIG. 1 is a schematic view of a resin maintenance system.

Referring to the drawings wherein identical reference numerals denote the same elements throughout the various views, FIG. 1 illustrates a resin maintenance system 10. The resin maintenance system 10 includes a main feed tank 20 and at least one vat 30. The system 10 is configured to provide resin for at least one 3-D printing machine such that the resin quality is maintained within predetermined parameters for many sequential build sequences.

Figure 3:
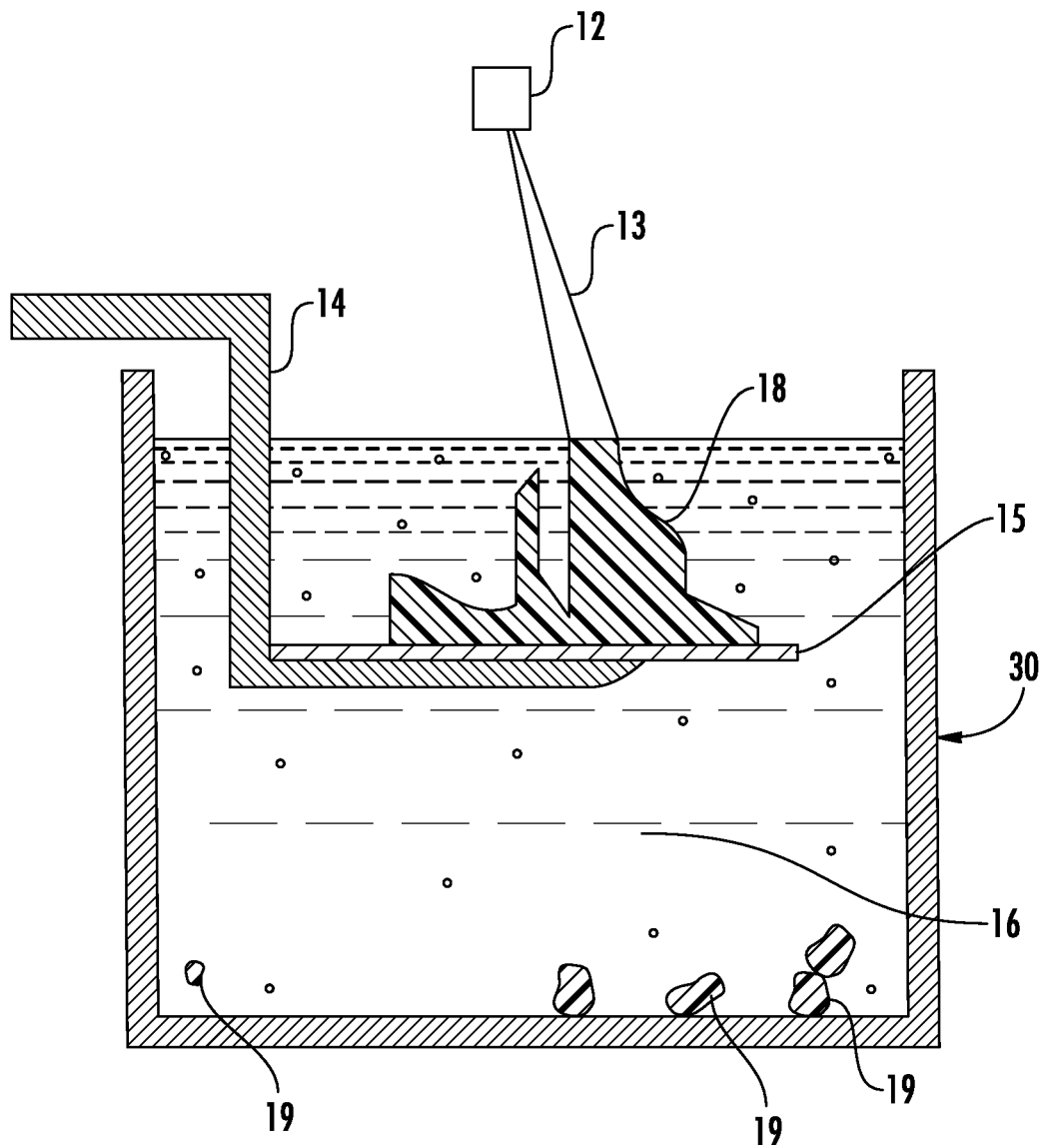
FIG. 3 shows a cross-section of a vat associated with a 3-D printing machine during a build cycle.

Referring now to FIG. 3, a 3-D printing machine includes a vat 30 and a support arm 14 that is configured to position a platform 15 at predetermined locations within the vat 30. An energy source 12, such as a laser or a UV light source is positioned above the vat 30 and is configured to generate an energy beam 13. The vat 30 is configured to receive a liquid resin 16 such that the platform 15 is submerged within the liquid resin 16. The energy source 12 is configured to direct beam 13 onto the surface of liquid resin 16 contained within the vat 30 such that a layer of liquid resin is cured to form a portion of a solid part 18. By way of example and not limitation the liquid resin 16 can be any liquid suitable for a 3-D manufacturing process such as a photopolymer resin.

Referring again to FIG. 1, the resin maintenance system 10 includes a main feed tank 20 that can be fluidly connected to at least one of a plurality of 3-D printing machines. As indicated above, each 3-D printing machine includes a vat 30 such that a plurality of vats 30 can be fluidly connected to the main feed tank 20. In this regard, a feedline 22 is fluidly connected at one end to the main feed tank 20 and at another end into a feed manifold 24. A plurality of vat drop lines 26 are fluidly connected to the feed manifold 24 such that each of the vat drop lines 26 is fluidly connected to a respective vat 30. An inlet valve 28 is positioned within each of the drop lines 26 between the feed manifold 24 and the vat 30. Each of the valves 28 is configured to be movable between a closed first position and an open second position. When the inlet valve 28 is in the closed first position, the respective vat 30 is not connected to the main feed tank. When the inlet valve 28 is in the open second position, the respective vat 30 is fluidly connected to the main feed tank.

Each of the vats 30 is configured to be fluidly connected to the main feed tank and a return manifold 32 which is fluidly connected to a return line 44. The return line 44 is configured to discharge into the main feed tank 20. An outlet line 34 extends from each of the vats 30 the return manifold 32. An outlet valve 36 is positioned within each of the outlet lines 34 of the respective vat 30. Each outlet valve 36 is configured to be moved between a closed first position and an open second position. When an outlet valve 36 is in the closed first position the vat 30 is not fluidly connected to the return manifold 32. When an outlet valve 36 is in the open second position, the respective vat 30 is fluidly connected to the return manifold 32. According to the illustrated embodiment, a first pump 46 is positioned within the return line 34 and is configured to be operable to convey the resin 16 from at least one of the plurality of vats 30 to the main feed tank 20. It will be understood that flow of the resin 16 within the system may be affected by any desired means including one or more pumps, pressurization, and/or gravity flow.

It should be appreciated that different embodiments could have the relative positions of the feed tank 20 and the vats 30 such that the pumps, valves, and piping used to convey resin between the tanks is different than that shown in accordance with generally understood principles of fluid transfer and plumbing.

Figure 2:
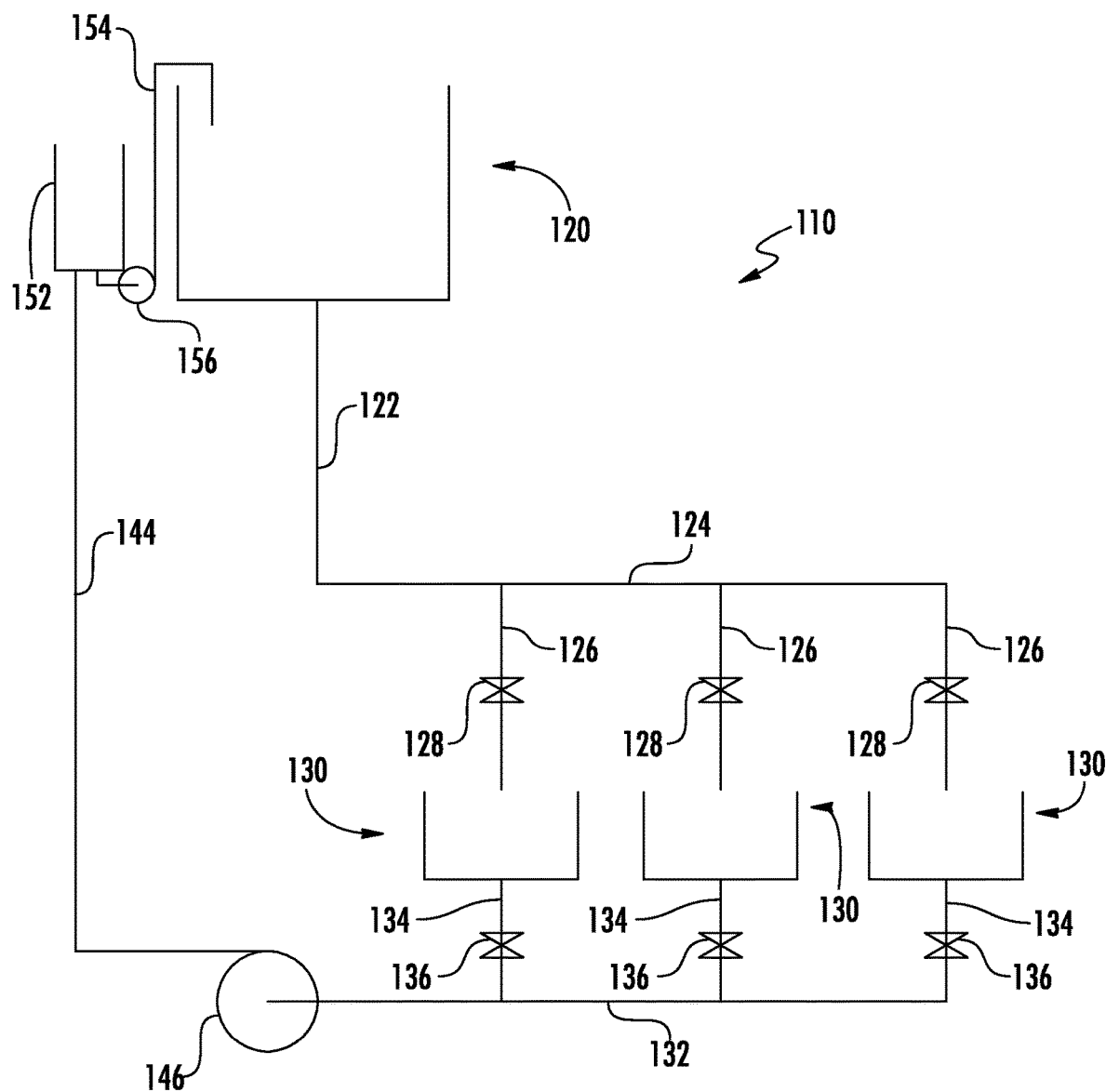
FIG. 2 is a schematic view of another embodiment of a resin maintenance system.

Referring now to FIG. 2, there is shown an alternative embodiment in which elements associated reference numbers of the 100 series are substantially similar to elements associated with similar reference numbers refer to above. According to the alternative embodiment, a resin maintenance system 110 includes a main feed tank 120 that can be fluidly connected to at least one of a plurality of 3D printing machines. Each 3-D printing machine includes a vat 130 such that a plurality of vats 130 can be fluidly connected to the main feed tank 120. In this regard, a feedline 122 is fluidly connected at one end to the main feed tank 120 and another into a feed manifold 124. A plurality of that drop lines 126 are fluidly connected to the feed manifold 124 such that each of the vat drop lines 126 is fluidly connected to a respective vat 130. A valve 128 is positioned within each of the drop lines 126 between the feed manifold 124 and the vat 130. Each of the valves 128 is configured to be movable between a closed first position and an open second position. When the valve 128 is and the closed first position, the respective vat 130 is not connected to the main feed tank and when the valve 128 is in the open second position, the respective vat 130 is fluidly connected to the main feed tank.

Each of the vats 130 is configured to be fluidly connected to the main feed tank and a return manifold 132 which is fluidly connected to a return line 144. The return line 144 is configured to discharge into a maintenance tank 152. The transfer line 156 has one end fluidly connected to the maintenance tank 152 and another and that is fluidly connected to the main feed tank 120. A transfer pump 156 is positioned within a transfer line 154 and is configured to convey fluid through transfer line 154 from the maintenance tank 152 to the main feed tank 120.

An outlet line 134 extends from each of the vats 130 the return manifold 132. An outlet valve 136 is positioned within each of the outlet lines 134 the respective vat 130 and the return manifold 132. Each outlet valve 136 is configured to be moved between a closed first position and an open second position. When an outlet valve 136 is in the closed first position the vat 130 is not fluidly connected to the return manifold 132. When an outlet valve 136 is in the open second position, the respective vat 130 is fluidly connected to the return manifold 132. According to the illustrated embodiment, a first pump 146 is positioned within the return line 134 and is configured to be operable to convey resin from at least one of the plurality of vats 130 to the maintenance tank 152.

Each 3-D printing machine is configured to operate in a printing cycle, or build cycle, during which a single part or a predetermined number of parts is manufactured. As used herein, the term "part" refers to one or more objects made within a single build that that occurs within the vat 30 and utilizes the resin therein. Each build cycle can last for up to several days. Typically, a build cycle will last between one and three days. At the beginning of a build, the platform 15 is positioned near the surface and the vat 30 is filled with resin such that a layer of resin 16 covers the platform 15. Then a curing step is conducted. During the curing step, the energy source 12 is activated and a portion of a layer of the resin 16 is cured by the beam 13 to form a portion of a solid part 18. After the curing step, the support arm is repositioned such that the platform 15 is lower relative to the vat 30 and a new layer of the liquid resin 16 is positioned over the newly formed portion of the solid part 18.

A part made within the vat 30 during a build generally consumes much less resin than is contained within the vat 30. Therefore, at the end of each build, a substantial portion of the resin initially charged to the vat 30 remains within the vat 30. Prior to the subsequent build, the vat 30 is topped up with additional resin. As a result, the vat 30 contains resin that is been through at least one prior build and resin newly charged to the vat 30.

This process can continue through many sequential builds, i.e., build cycles. Many problems can occur as a result. These problems are a result of changes that occur over a period of time. Over time, polymerization can occur of a resin without exposure to the driving force for catalyst such as a laser that might be used in the 3-D printing machine. When polymerization occurs, viscosity goes up as a side effect. Polymerized particles or chunks settle to the bottom and can act as a nucleus or seed to increase the rate of polymerization. As a result, resin is removed from being available for making parts. Another problem is the loss of reaction functionality, the loss of initiator, through separation and agglomeration, and a loss of solvents through evaporation. Such losses also increase the viscosity which affects the functionality of the resin. In this regard, flow characteristics of the resin affect the operation of the 3-D printing machine. Such flow current characteristics must be generally predictable so that layer formation during the 3-D printing process is consistent. As a result of these problems, the vats 30 must periodically undergo a cleanout involving draining all the resin and cleaning the vat's interior. This requires undesirable downtime during which parts cannot be built.

The present invention provides a method as described below that maintains the resin 16 at predetermined quality levels with fewer than the number of total cleanouts required according to conventional methods.

The present invention can be better understood by description of the operation thereof. In a main feed tank filling step, the main feed tank 20 is filled with the resin 16. The resin 16 can be added to the main feed tank 20 premade such that it has the desire predetermined qualities. Alternatively, the resin 16 can be formulated within the main feed tank 20. In this regard, the components of the resin 16 would be added and mixed appropriately. Mixing can be done by hand, by a mechanical mixer (not shown), or by other means as known in the industry. The following description will apply to one 3-D mixing machine and the associated vat 30. It should be appreciated that the operation of the all of the vats 30 is substantially similar and can be understood from the description of the operation of one of the vats 30.

In a preparation step, the associated inlet valve 28 is moved to the open second position and the vat 30 is filled to a predetermined level through drop line 26. The inlet valve 28 is then moved to the closed first position and the 3-D build cycle is begun. When the 3-D build cycle is completed, the valve 36 is moved to the open second position, the pump 46 is operated, and the resin 16 from the vat 30 is returned to the main feed tank 20. Return of the resin 16 to the main fee tank 20 tends to dilute any waste products accumulated in the vat 30 and tends to homogenize or average out the characteristics of the resin 16 received from all of the vats 30. A resin maintenance step may also be carried out as part of the return process. Resin maintenance can include, for example, mixing the resin in the main feed tank 20, checking or testing qualitative characteristics of the resin 16 (such as its viscosity, density, temperature, pH, or chemical composition), filtering resin 16 before return to the main feed tank 20 (for example, by passing it through a filter or screen 21), adding fresh constituent ingredients to the feed tank 20, or adding fresh resin 16 to the feed tank 20. In this manner, the resin 16 returned from the vat 30 is maintained at the desired qualitative characteristics.

The subsequent build cycle is then conducted by beginning with the preparation step described above. The steps described above can be repeated for subsequent build cycles such that the resin 16 is maintained in a predetermined quality and extensive cleanouts are not required. It should be appreciated that determining when and how often the above steps should be repeated can be based upon a set number of build cycles, laser exposure hours, the resin chemical signature, or as part of the standard operating procedure related to early shutdowns of a build cycle, normal operational build cycle, or emergency shutdown of a build cycle.

The operation of the alternative embodiments described above can be better understood from the following description. This description should be read in view of the description of the main embodiment above in this regard, operation of elements referred to with reference numbers in the 100 series can be understood from the description above of similarly numbered elements in the 1 series. In the alternative embodiment, the resin 16 is from the vat 130 is returned to the maintenance tank 152. The resin maintenance steps described above may then performed with the returned resin 16 in the maintenance tank 152. After completion of the resin maintenance step and prior to the beginning of the next build cycle with the preparation step, a transfer step is conducted. The transfer step includes operating the transfer pump 156 such that the returned resin 16 is transferred from the maintenance tank 152 through the transfer line 154 into the main feed tank 120.

A subsequent build cycle can be conducted by returning to the preparation step.

The foregoing has described a resin maintenance system 10 and method for maintaining resin quality for 3-D printing process and manufacturing system within predetermined parameters. Operation of the system 10 provides for reduction of undesirable effects such as: the accumulation of polymerized particles in the vat 30, the loss of initiator through evaporation, and the increase of viscosity of the resin among other problems. As a result, downtime of associated 3-D printing machines is reduced when compared to conventional methods. Also, loss of resin is also reduced when compared to conventional methods.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method for maintaining resin in a system including a main feed tank and a plurality of vats, each of the plurality of vats associated with a 3-D printing machine, the method comprising the steps of:
    transferring resin from the main feed tank to one vat of the plurality of vats via an inlet valve configured to, when in an open position, feed the resin from the main feed tank to the one vat of the plurality of vats;
    operating the associated 3-D printing machine in a build cycle;
    at an end of the build cycle, moving an outlet valve positioned in an outlet line from the one vat of the plurality of vats from a closed position to an open position to enable the resin to flow from the one vat of the plurality of vats to the main feed tank;
    returning the resin from the one vat of the plurality of vats to the main feed tank via the outlet line at the end of the build cycle; and
    repeating in a cycle the steps of transferring the resin, operating the 3-D printing machine, moving the outlet valve, and returning the resin, wherein the method is carried out for the plurality of vats fluidly connected to the main feed tank.

2. The method of claim 1 further comprising maintaining the resin in the main feed tank such that the resin has a predetermined qualitative characteristic.

3. The method of claim 2 wherein maintaining the resin comprises mixing fresh resin into the main feed tank.

4. The method of claim 2 wherein maintaining the resin comprises mixing fresh resin constituents into the main feed tank.

5. The method of claim 2 wherein maintaining the resin comprises filtering the resin prior to returning it to the main feed tank.

6. The method of claim 2 wherein maintaining the resin comprises testing the resin to check the predetermined qualitative characteristic thereof.

7. The method of claim 2 wherein the resin is maintained in a transfer tank and subsequently transferred to the main feed tank.

8. The method of claim 1, further comprising moving the outlet valve from the open position to the closed position to fluidly disconnect the one vat of the plurality of vats to the main feed tank after returning the resin to the main feed tank.

9. A system for maintaining resin used in sequential build cycles by a 3-D printing machine, comprising:
    a main feed tank;
    a plurality of vats fluidly connected to the main feed tank to receive resin from the main feed tank;
    an inlet valve connected to each vat of the plurality of vats and configured to, when in an open position, feed the resin from the main feed tank to a respective vat of the plurality of vats;
    an outlet valve positioned in an outline line from each vat of the plurality of vats; and
    wherein a respective outlet valve is movable from a closed position to an open position at an end of a build cycle to enable the resin to flow through a respective outlet line from a respective vat of the plurality of vats to the main feed tank such that the resin can be returned from the respective vat of the plurality of vats via the respective outlet line to the main feed tank at the end of a build cycle.

10. The system according to claim 9, further comprising:
    a feed line that is fluidly connected to the main feed tank at one end and is configured to fluidly connect the main feed tank to each of the plurality of vats.

11. The system according to claim 10, further comprising:
    a feed manifold connected to the feed line, wherein the feed manifold is configured to be fluidly connected to the plurality of vats.

12. The system according to claim 11, further comprising:
    a plurality of drop lines connected to the feed manifold, wherein each drop line is associated with one vat of the plurality of vats.

13. The system according to claim 12, wherein each drop line includes a respective inlet valve moveable between the open position and a closed position.

14. The system according to claim 9, further comprising:
    a return line that is fluidly connected to the main feed tank at one end and is configured to fluidly connect the main feed tank to each of the plurality of vats.

15. The system according to claim 14, further comprising:
a return manifold connected to the return line, wherein the returned manifold is configured to be fluidly connected to the plurality of vats.

16. The system according to claim 12, further comprising:
a maintenance tank;
a return line;
a transfer line; and
wherein each vat of the plurality of vats is configured to be fluidly connected to the maintenance tank via the return line; and the maintenance tank is configured to be fluidly connected to the main feed tank via the transfer line.

17. The system according to claim 9, further comprising a filter operable to filter the resin prior to the resin returning to the main feed tank.

\* \* \* \* \*